United States Patent [19]
Hall et al.

[11] Patent Number: 5,703,623
[45] Date of Patent: Dec. 30, 1997

[54] SMART ORIENTATION SENSING CIRCUIT FOR REMOTE CONTROL

[76] Inventors: Malcolm G. Hall, 7901 Queenair Dr. #104; Russell W. Faulkner, 7901 Queenair Dr., both of Gaithersburg, Md. 20879

[21] Appl. No.: 590,513

[22] Filed: Jan. 24, 1996

[51] Int. Cl.⁶ .................................................. G09G 5/08
[52] U.S. Cl. .......................... 345/158; 345/156; 345/157
[58] Field of Search ........................ 345/156, 157, 345/158, 163, 167; 74/471 XY; 178/18, 19; 273/148 B

[56] References Cited

U.S. PATENT DOCUMENTS

| | | | |
|---|---|---|---|
| 4,839,838 | 6/1989 | LaBiche et al. | 345/157 |
| 4,961,138 | 10/1990 | Gorniak | 364/200 |
| 4,988,981 | 1/1991 | Zimmerman et al. | 345/158 |
| 5,128,671 | 7/1992 | Thomas, Jr. | 345/161 |
| 5,168,221 | 12/1992 | Houston | 345/167 |
| 5,335,557 | 8/1994 | Yasutake | 73/862.043 |
| 5,381,158 | 1/1995 | Takahara et al. | 345/156 |
| 5,526,022 | 6/1996 | Donahue et al. | 345/156 |
| 5,565,891 | 10/1996 | Armstrong | 345/156 |
| 5,581,484 | 12/1996 | Prince | 345/173 |
| 5,589,828 | 12/1996 | Armstrong | 345/161 |

Primary Examiner—Raymond J. Bayerl
Assistant Examiner—Matthew Luu

[57] ABSTRACT

The invention relates to a smart device which senses changes to its own position and/or orientation, and transmits this information in a signal, which can be used to control a cursor on a view screen, or other features of an external device such as a computer, television, or electromechanical mechanism, said smart device comprising a plurality of polymer thinfilm piezoelectric sensors, and a plurality of semiconductor Hall-effect sensors, disposed in a housing in a manner cooperatively providing X-axis, Y-axis, and Z-axis relative translational and/or absolute rotational data.

18 Claims, 19 Drawing Sheets

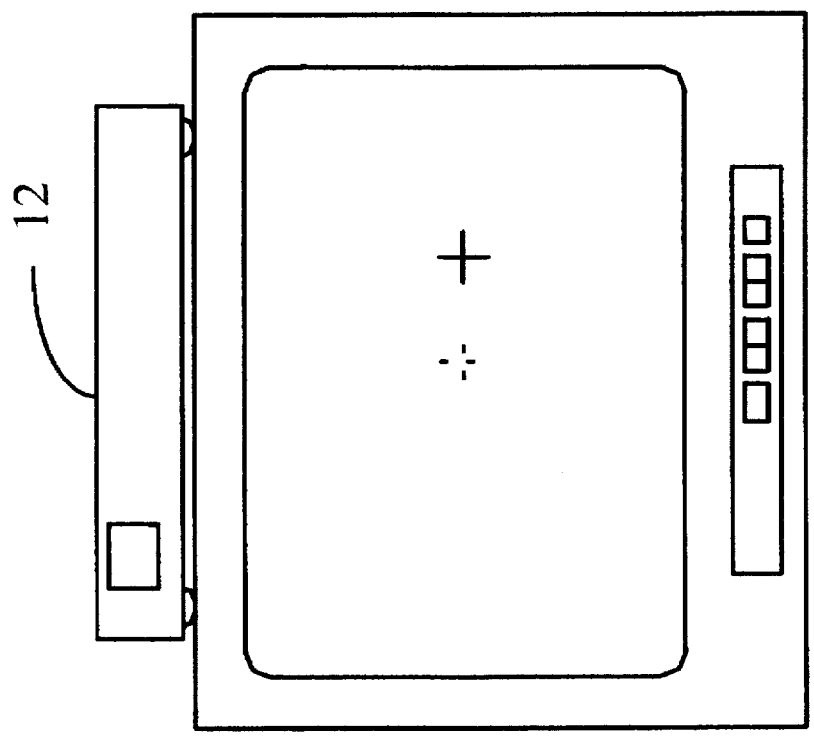
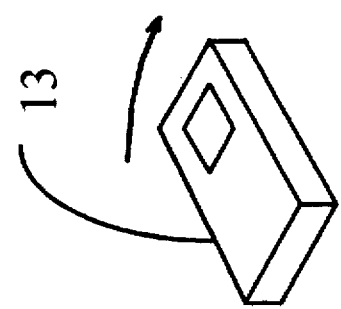
Fig. 1

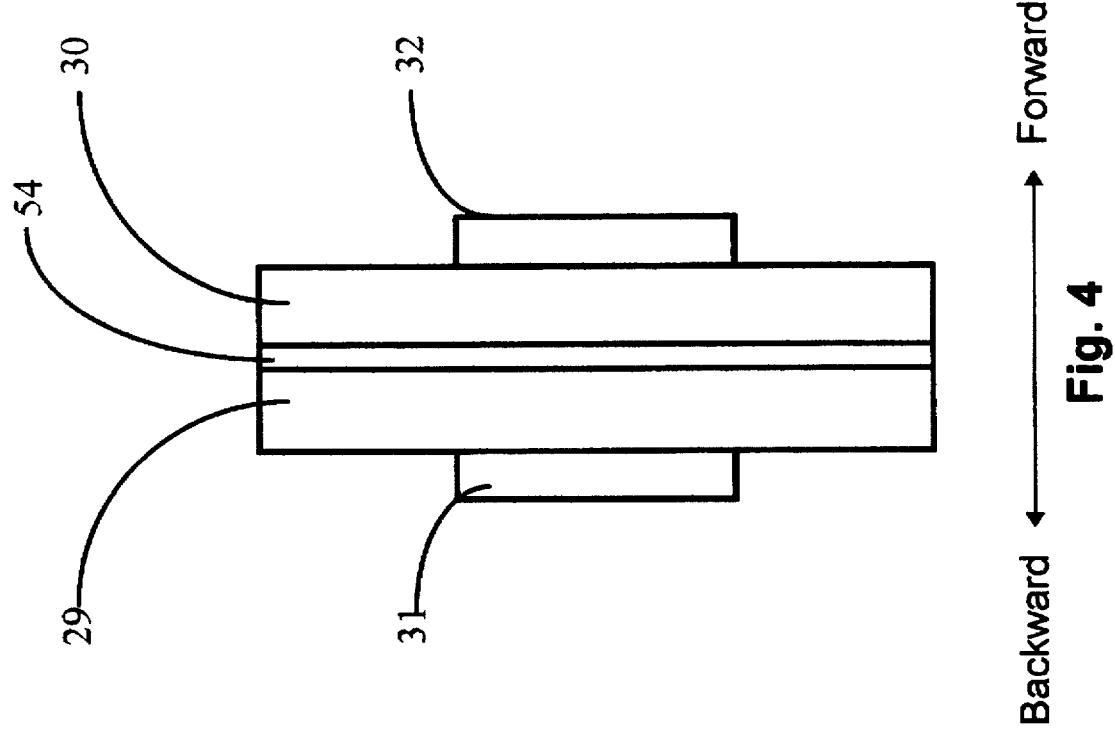

SMART ORIENTATION SENSING CIRCUIT FOR REMOTE CONTROL

BACKGROUND OF THE INVENTION

1. The Field of the Invention

The present invention relates to the field of position and orientation-sensing devices. More specifically, the present invention relates to a low cost, semiconductor, position and orientation-sensing circuit designed for communication of spatial coordinate data to other electronic devices for internal or external control of such devices.

2. Prior Art Background of Orientation and Position Sensing Devices

Historically, cost barriers and inadequate technology have prevented commercial exploitation and developmental offering of products for pointing and object control that have an inherent ability to determine orientation, position and location over time and measure in multiple dimensions with up to 6 degrees of freedom. Human factors must be considered and effectively weighed when using a pointing and orientation sensing device designed into a new generation of interactive products. Conventional methods for pointing orientation have historically been accomplished with mechanical and optical handheld, roller or gyro type devices. For example, a video screen pointing device must provide excellent pointing accuracy while reducing the amount of operator dexterity required to operate it as compared with traditional thumb controlled remote control devices. The optimal design provides maximal interaction between the pointing device and the video screen cursor so that it becomes a natural hand or wrist motion rather than a thumb or finger dexterity exercise.

An innovative smart orientation-sensing device that has low manufacturing cost, small size, and light weight will allow the use of various ergonomic designs and input/output devices for commercial and/or production environments. A 3D, video screen, multimedia control device must be able to determine position, direction, acceleration, over-all orientation including rotation about the Z axis yaw, Y axis pitch and X axis roll as well as translation through X, Y and Z to meet future 3D multimedia applications. The ability to measure output signal characteristics from the suggested sensing techniques will allow for the accomplishment of analysis of signal time and amplitude domain information for orientation sensing.

Most orientation devices, such for example as mice, joysticks and trackballs, utilize a mechanical interface, such as a rotating ball and pressure resistive switches, that are physically directed and controlled by the user to determine the correct position and/or orientation. Currently these devices normally operate only in two dimensions. Other devices are motor driven or require either an optical or magnetic sensing grid or a flat surface for manipulation of a ball by the user. A certain amount of direct physical contact is required of the operator to accurately position the cursor. Systems such as touch sensitive screens or light pens, require usage in close proximity to the monitor screen. In addition, these devices are sensitive in a detrimental manner to oil, dirt and other forms of contamination. Some prior art patents have improved on the basic design of these devices but not to the degree required for interactive video screen or virtual reality control.

An Inertial Mouse System such as the one described in L. T. Olson's, U.S. Pat. No. 4,787,051 utilizes preassembled accelerometer devices exclusively to derive positional information in a two or three dimensional plane for the purpose of drawing lines in a Computer Aided Design system, herein after referred to as CAD. Neither this device, nor its sensors, provide any angular orientation sensing capability directly without an external device or computer. Even with a external device or computer, orientation sensing is relative, not absolute. This results in drift. Both preferred embodiments of Olson's patent require a photodetector and a flat surface or pad upon which to operate. Furthermore, there is no teaching nor suggestion of such a device having the independent capability for determining its own starting position or reference point to begin operations. To determine changes in position within a plane, the Olson system senses translation from a first accelerometer. Rotation is obtained from the difference in translational acceleration sensed by the first accelerometer and a second accelerometer. This technique mandates precision mounting of the accelerometer pair, as well as processing to decouple translation from rotation and to determine both the rotational axis and rate. Thus, the device translation from rotation and to determine both the rotational axis and rate. Thus, the device disclosed by Olson et al. Requires extensive processing by the computer which may render the device incompatible with lower end computing devices. Additionally, this technique would require highly sensitive accelerometers to obtain low rotational rates.

In the Olson device, analog integrator circuits are used for the first stage of integration required to obtain displacement from acceleration. These integrator circuits have limits in dynamic range and require periodic resets to zero to eliminate inherent errors of offset and drift. The Olson device also constrains the use of the remote device to a limited range of orientation with respect to the computer in order to permit proper communication. Furthermore, no provision is made in the Olson system to prevent interference from signals originating from nearby input devices which control nearby computer workstations.

The Orientational Mouse Computer Input System of Cambridge, U.S. Pat. No. 5,162,781, provides orientation sensing in two-dimensions as well as rotation of the mouse in a two-dimensional plane through the use of optical and conductive sensors. This approach provides a solid state orientation sensing device, however, a conductive and reflective "pad" is required in order for positional information to be obtained. Either of these methods lose all orientation sensing capability as soon as the mouse is lifted from its pad or surface.

The use of non-semiconductor, off the shelf, conventional, rate and acceleration sensing mechanical devices taught by Glynn, U.S. Pat. No. 5,181,181, titled "Computer Apparatus Input Device for Three Dimensional Information", are physically limited to one hardware configuration for three degrees of freedom to function. The mechanical motion of localized, movable magnets near each sensor housing is required to provide orientation sensing. The Glynn device uses mechanically tooled sensing elements, is mounted in only one possible relative position on its own subassembly then further mounted to the mouse chassis. This creates a device unsuitable for compact designs. This device utilizes non-semiconductor technology for detection of acceleration and rotation and therefor is adversely affected by the gravitational forces of the Earth, resulting in increased signal processing overhead. acceleration and rotation and therefor is adversely affected by the gravitational forces of the Earth, resulting in increased signal processing overhead.

Michael R. Clark teaches the use of conveyer belts in conjunction with optical detectors and a roller ball to sense three degrees of freedom in his U.S. Pat. No. 5,132,672, titled "Three Degree of Freedom Graphic Object Controller". Although unique in concept, this approach is fraught with potential mechanical problems as none of the sensors are solid state. Additionally, the dexterity and finger movement required for full operation of this device may prove tiresome and difficult for some users.

Paley, U.S. Pat. No. 5,296,871, titled "Three-Dimensional Mouse with Tactile Feedback", discloses the use of a handheld, free-space, orientation sensing controller. The approach taken in this device requires magnetic sensors, localized ultrasonic transmitters and receivers such as the Polhemus 3Space and an external data processing unit for determination of position and orientation. A mechanical vibrator is required to provide tactile feedback.

Another free space device is taught by Thomas J. Quinn in U.S. Pat. No. 5,440,326 titled "Gyroscopic Pointer" which issued Aug. 8, 1995. This device utilizes a gimbal mounted ball with two linear encoders and optical sensors to determine the orientation of the ball in three dimensions. It also requires that the pointer be held in a specific orientation in order for the gimbal to move freely. Additionally, the mechanical components of the gyroscope are rather large and cumbersome for incorporation into an ergonometric design.

These patents neither utilize nor suggest the teaching of a combination of these technologies, that is semiconductor Hall-effect and/or thinfilm piezoelectric-effect sensors, to produce the orientation sensing capabilities required for 3-dimensional orientation control. Additionally, none of these devices, assembled on a single circuit card, utilize an internal CPU for processing orientation or off-axis translation data. The comprehension of the sensor technology specified in the majority of these patents, appears vague and limited more to concept than device design when describing the components within the device that comprise the preferred embodiment. than device design when describing the components within the device that comprise the preferred embodiment.

Standard, conventional video screen remote controllers do not provide the degree or amount of cursor control necessary for interactive TV, thus they have proven inadequate and confusing to some users. Historically, the increased complexity created through the addition of buttons to these devices as functionality increases has been the rule not the exception. Although mice, trackballs, joysticks and conventional TV remotes are adequate for most computer and TV applications, their aforementioned and obvious drawbacks render them ineffective, and hence unacceptable for use in the interactive multimedia TV and virtual reality markets. Cords, surface requirements, proximity to the screen and environmental sensitivities make all of the devices and/or methods of the prior art awkward for the new wave of interactive multimedia and virtual control devices. Accordingly, one of the objects of the present invention is to provide a new and improved device that overcomes the aforementioned shortcomings of previous computer input techniques. Additionally, a primary object of the present invention is to provide a means for an operator to input to a multimedia video system information which allows the multimedia video system to ascertain position, motion and attitude of the input device in terms of three-dimensional spatial coordinates.

It is another object of the present invention to provide a new improved apparatus and method for controlling movement of a cursor, represented on a video screen display in terms of three-dimensional spatial coordinates.

SUMMARY OF THE INVENTION

Two embodiments are herein disclosed. One relates to a simplified version of an orientation and position smart sensor embedded into a handheld remote pointer or mouse adapted for use as a cursor or object control device.

One aspect of the preferred embodiment of the present invention is that it meets all future requirements for an interactive TV remote control device as published in the Radio Electronics Now Magazine dated December 1994. To meet these requirements, the preferred device requires a minimum of operator dexterity for control and has few or no moving parts due to its solid state circuits and sensors. This device has no confusing array of buttons or functions to learn due to its intelligent interface software allowing for the use of a flexible, thinfilm, piezoelectric, pressure sensitive type button. The inherent ability to turn itself on or off when motion or the lack of motion is sensed, provides an energy saving feature and resolves the problem of processing ambiguous data when not in use. The fusion of semiconductor Hall-effect and thinfilm piezoelectric effect technology, allows for flexibility in the design of a more ergonomic, handheld device for any relevant remote sensing or control application. The internal digital signal processor, herein after referred to as DSP, samples the multiplicity of sensor amplitudes for their voltage levels over a time domain to determine positional and orientational data or intelligence. This requires neither a planar surface structure nor moving parts unlike U.S. Pat. Nos. '781, '326, '672, '871 & '181 cited herein. A communications device, sending Cartesian coordinate data and angular rotation intelligence changes, provides a tremendous increase in positioning ability, thus reducing the amount of manual dexterity required. Due to it's semiconductor, solid state, electronic architecture and totally enclosed encapsulating housing, the device is not affected by contamination. Although mice and remote controls for many devices including home entertainment and computers have existed for some time, none have attempted to incorporate in a single unit the qualities required for virtual reality object and cursor control. The embedded intelligence melding herein conatates a fusion of semiconductor Hall-effect sensing and thinfilm piezoelectric effect technology to provide solutions to recognized problems occurring in the remote control of electronic devices. Both of these sensor types are encompassed by known technologies, however, the configurations and combinations of the two have never previously been used in determining single or multiple degrees of freedom within an orientation sensing remote control device. been used in determining single or multiple degrees of freedom within an orientation sensing remote control device.

Currently, access to video screen multimedia operations is provided through an infrared remote control which allows the user to step through a video overlay menu by pressing UP and DOWN keys on the remote. The preferred embodiment will allow the user to point, by a simple hand movement, to an icon on the video overlay and select the desired operation or function.

FEATURES AND OBJECTS

It is one feature of the invention to accomplish a fusion of two differing sensor technologies. Another feature resides in the provision of unique energy-saving capabilities in a hand held controller which is activated automatically. The preferred embodiment includes an embedded DSP for processing sensor data to determine all six degrees of freedom. Additionally, up to six degrees of freedom in three dimensions are possible. The device Utilizes Hall-effect semiconductor sensors for angular sensing of yaw, pitch and roll around the three axis. Since the device uses the Earth's magnetic field and gravity, orientation sensing is absolute, not relative. This prevents drift. An additional aspect of the preferred embodiment involves a technique for self-activation when moved by the user or an event. The preferred embodiment includes an auto detect position locator, giving the device a reference point relative to the magnetic north pole of the Earth. Additional features such as the lack of moving parts in the preferred device, no requirement for a pad or surface from which to operate, no moving mechanical components and no magnets for localized reference are obvious improvements over present technology. It is another objective of this invention to provide a new and improved apparatus and method for sensing translation in the X, Y and Z axes utilizing piezoelectric, thinfilm sensors. It is also an object of the present invention to enhance the motion sensing capabilities and dynamic range by a new and improved method. One objective of the invention is to provide an all solid state circuitry, position and orientation sensing system utilizing two differing pairs of sensors. A further object is to incorporate within one smart sensor unit a first pair of sensors, thinfilm, piezoelectric pressure-sensitive devices and as the second pair of sensors, devices utilizing Hall-effect technology. Another object resides in the provision of a new and novel hand-held, free-space operational position sensor with a DSP and controller which provides all of the desirable functions of a DSP transceiving apparatus of the prior art while obviating all of the undesirable or detrimental functioning limitations thereof. Another object resides in the provision of an aesthetic and ergonomically acceptable controller for interactive applications which is economical to manufacture. Another object resides in the provision of a controlling device, for interactive systems, which provides X, Y and Z axis signal processed output, for input to utilization systems and electrical or optical output thereof. Still another object resides in the accomplishing of the functions of the foregoing object while rendering obsolete most if not all devices for this purpose existent in the prior art. Another object of the present invention resides in the provision of a greatly improved indicating and controlling device for a three dimensional mouse application for advantageously interfacing with a central processing unit and providing free space hand-held operability by mere wrist movement by a human operator all embedded in a single device without additional external processors.

The aforementioned and other objects, features and many of the attendant advantages of the present invention will be apparent or become obvious to one skilled in the art to which the invention pertains, when taken with the following detailed description, taken in view of the accompanying drawings, wherein like or similar reference characters are used for corresponding details and/or parts throughout the various figures of the drawings.

BRIEF DESCRIPTION OF THE DRAWINGS

FIG. 1 shows a hand held, free space, cursor/object control device as the preferred embodiment;

FIG. 4 shows the back to back piezoelectric sensor arrangement utilized in the preferred and alternate devices;

DESCRIPTION OF THE PREFERRED EMBODIMENT

The primary technical objective of the presentation of this patent application is to describe, as shown in FIG. 1 being directed at a video screen 12 a handheld, smart, remote-control, pointing and object orienting device 13 with six degrees of freedom in a Cartesian system. A combination of linear Hall-effect semiconductor sensor technology and a fusion; "a melding of differing technologies to provide a common functionality" of other types of sensor technology, specifically, thinfilm piezoelectric-effect, sensors integrated with a DSP and associated circuits on a printed circuit board.

Figure 2:
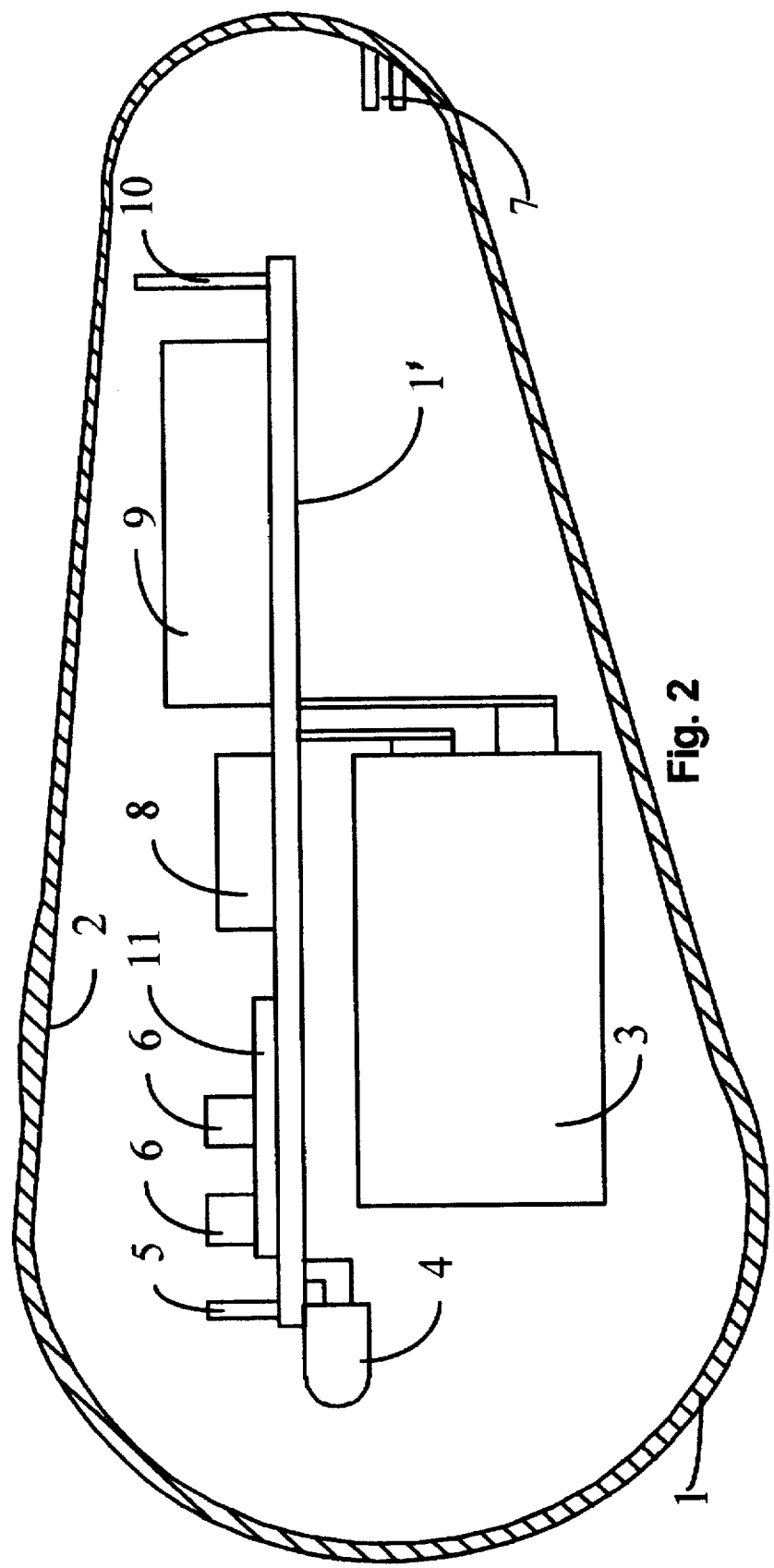
FIG. 2 shows said device transparent with sensors, processor, and other components placed appropriately.

The cut-away view of FIG. 2 shows the major components of the preferred embodiment. The casing 1 is comprised of infrared transparent plastic. This eliminates the need for a separate window and provides for a more aesthetically pleasing appearance as a solid, one piece, front face. The "Button" 2 is, in actuality, a pressure sensor embedded within the plastic membrane of the casing. The battery 3 is mounted below the circuit card 1' and is charged through two electrical contacts 7 located in the back of the casing. When the battery is low, a code indication is transmitted to the controlled video system receiver. A high intensity infrared light emitting diode, 4 herein after called LED1, is mounted under the card 1' in a forward facing position. It would be obvious to anyone skilled in the art that any wireless transmitter could be substituted for the LED. LED1 acts as the link between the device and a receiver mounted in the interactive control unit, TV, or computer. A pair of Hall-effect sensors 5 are mounted in the interactive control unit, TV, or computer. A pair of Hall-effect sensors 5 are mounted along the leading edge of the circuit card 1'. An additional pair of Hall-effect sensors 6 are mounted 90° opposed to the other Hall-effect sensors. These are the principle sensors providing the primary yaw, pitch and roll angular detection and bearing sensing capability of the device with some assistance from the piezoelectric pairs 9, 10, and 11. A microprocessor 8 interprets the individual signals from the sensors and the button and relays the control signals to the receiver via infrared LED1 4. A thinfilm piezoelectric sensor pair 9 is mounted along one side edge of the circuit card 1' providing translation sensing in the X axis. A second thinfilm piezoelectric sensor pair 10 is mounted at the rear of the circuit card 1' to provide sensing in the Z axis. Additionally, a third thinfilm piezoelectric sensor pair, 11 is mounted flush with the circuit card 1' to provide translational sensing in the Y axis. All three thinfilm piezoelectric sensor pairs work together to form a three dimensional vector-point plot. Furthermore, each provide some measure of orientation sensing whichever way the device is rotating. The Hall-effect and piezoelectric sensors work in conjunction to provide sensing in all 6 degrees of freedom needed to position a cursor on a TV screen for selecting viewing options or for operating a control panel in a virtual reality environment. A TV interactive system controller 12 interprets the signals from the device and moves the cursor position on the screen to allow selection of option icons.

Figure 3A:
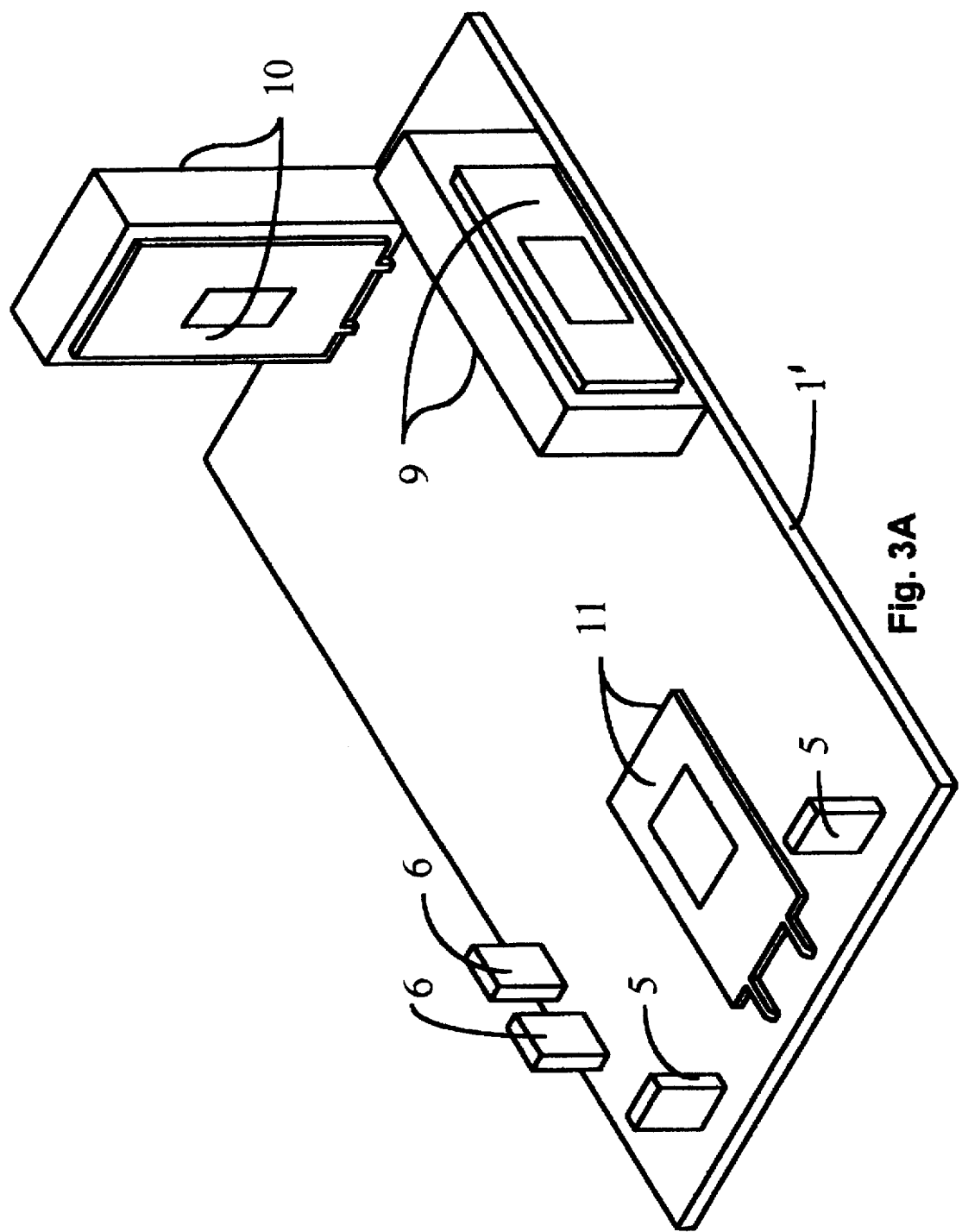
FIG. 3a shows two sets of Hall effect sensors for rotational detection and three sets of piezoelectric sensors for directional sensing as described in the preferred embodiment.
Figure 3B:
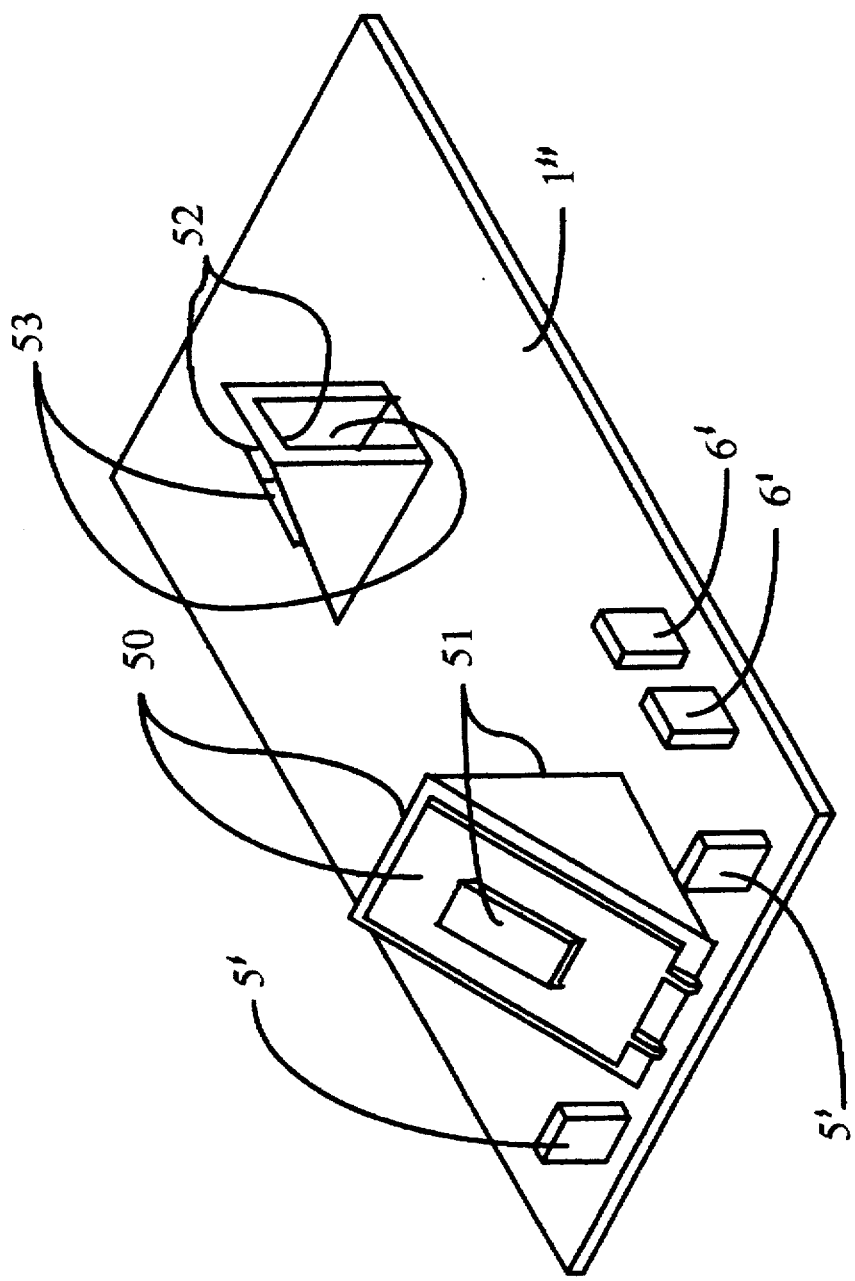
FIG. 3b shows a second embodiment utilizing two sets of Hall effect sensors and two sets of piezoelectric sensors.

FIG. 3a is of a printed circuit board 1' layout showing the actual preferred sensor configuration with a dielectric spacer between the piezoelectric sensor pairs 9, 10 & 11 and the two pair of 90° opposed Hall-effect sensors 5 & 6. FIG. 3b shows an alternative printed circuit board 1" layout of a simpler configuration for six degrees of freedom utilizing only two pair of piezoelectric sensors 50 & 52 each having their own mass components 51 & 53. This alternate layout reduces the sensor requirements but increases the DSP overhead.

FIG. 4 shows a thinfilm piezoelectric sensor pair 29 & 30, mounted back-to-back with a dielectric spacer 28 between them and a mass 31 & 32 centered on each piezoelectric sensor thus forming a single axis, bi-directional sensing element.

Figure 5A:
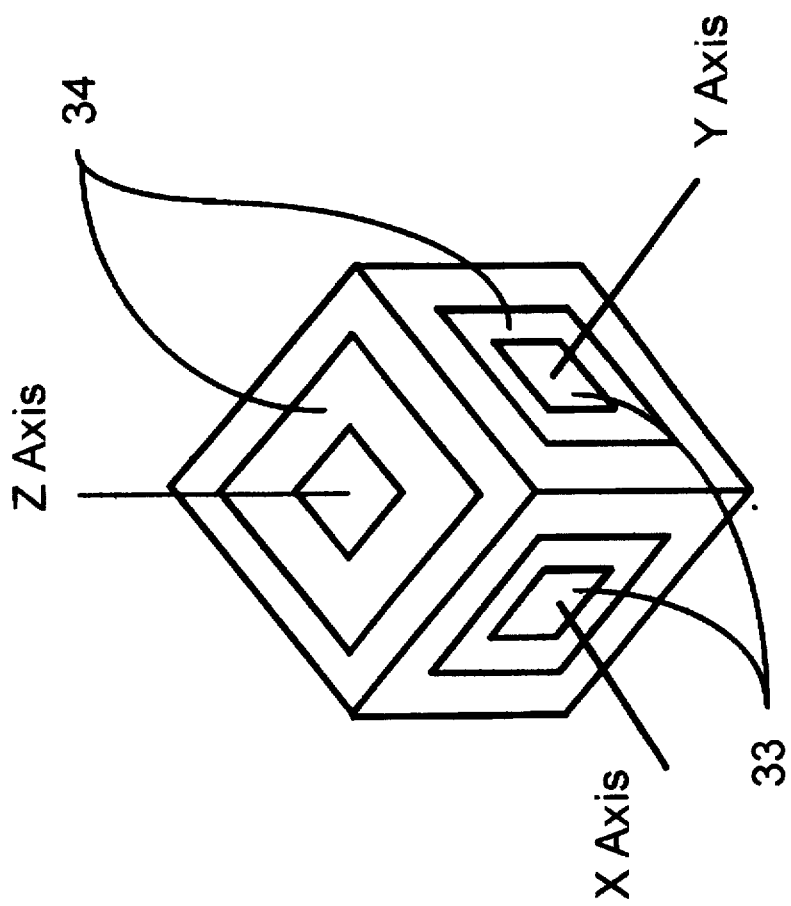
FIG. 5a shows still another embodiment of the preferred device with all the components arranged in a cube.
Figure 5B:
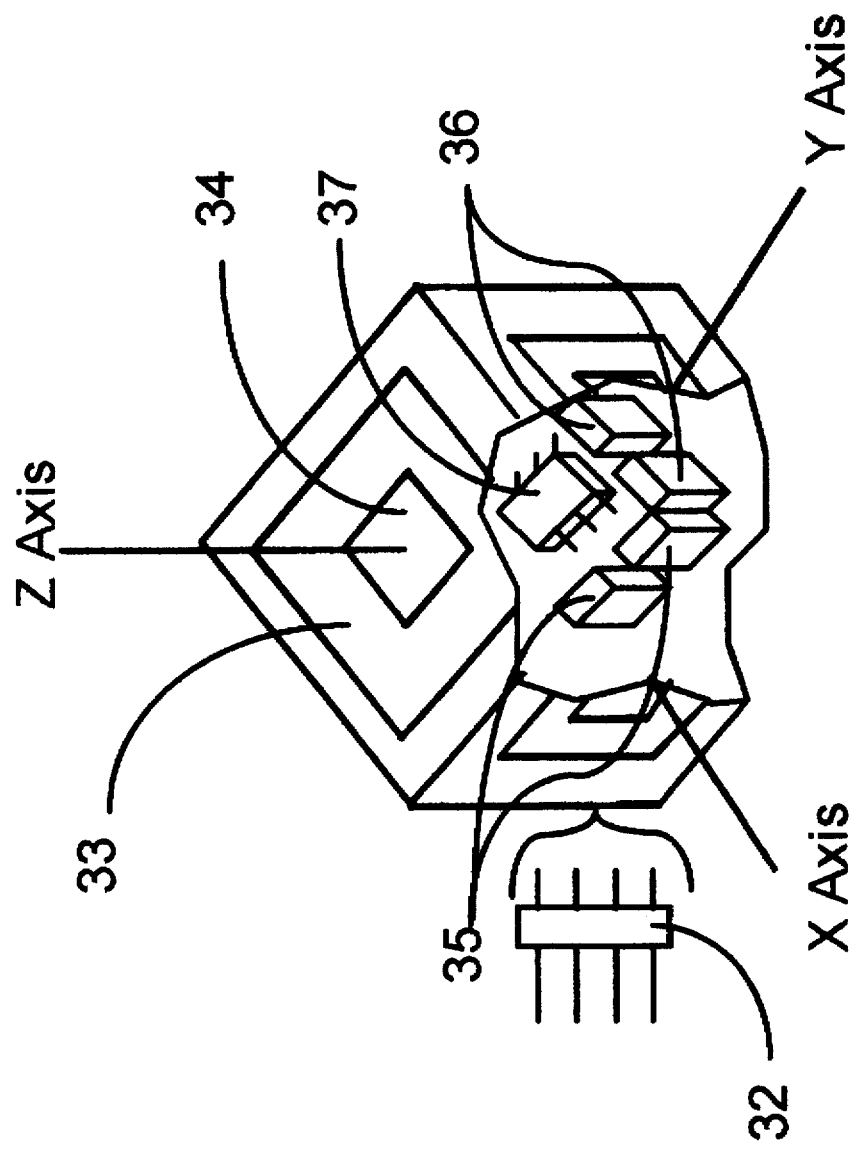
FIG. 5b is a cut-away showing the internal Hall-effect and signal processing components.

FIG. 5a and 5b show a cube device incorporating semiconductor Hall-effect 35 & 36, piezoelectric sensors 34 on each of six surfaces with a mass 33 centered on each one providing six degrees of freedom in three dimensions. A DSP 37 is mounted internally providing onboard signal processing and control with serial data output through the connector 32.

Figure 6:
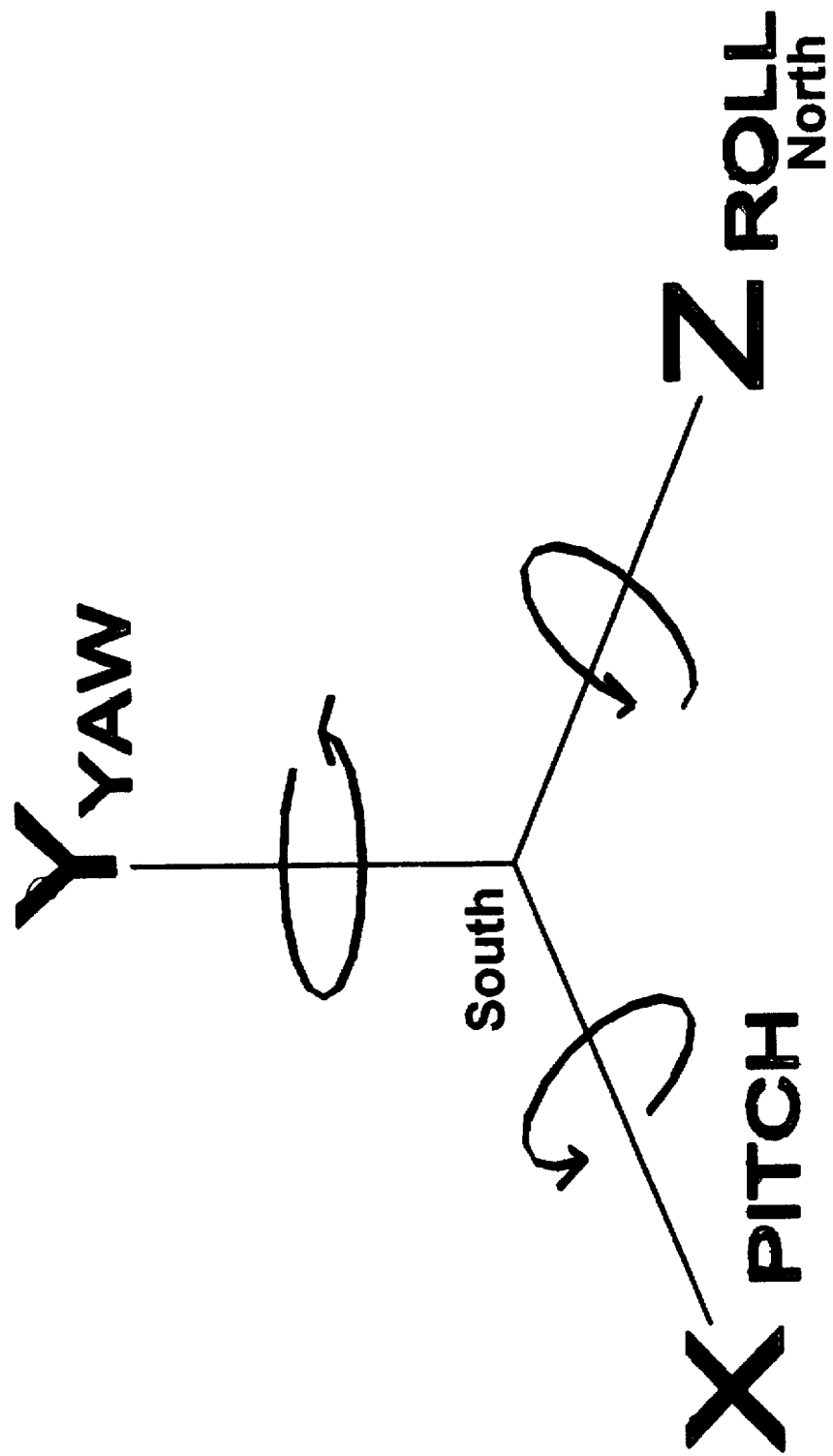
FIG. 6 shows the rotation around three axes known as yaw, pitch & roll.

FIG. 6 illustrates the six degrees of freedom X, Y, Z, yaw, pitch and roll in a three dimensional Cartesian coordinate system relative to magnetic north.

Figure 7:
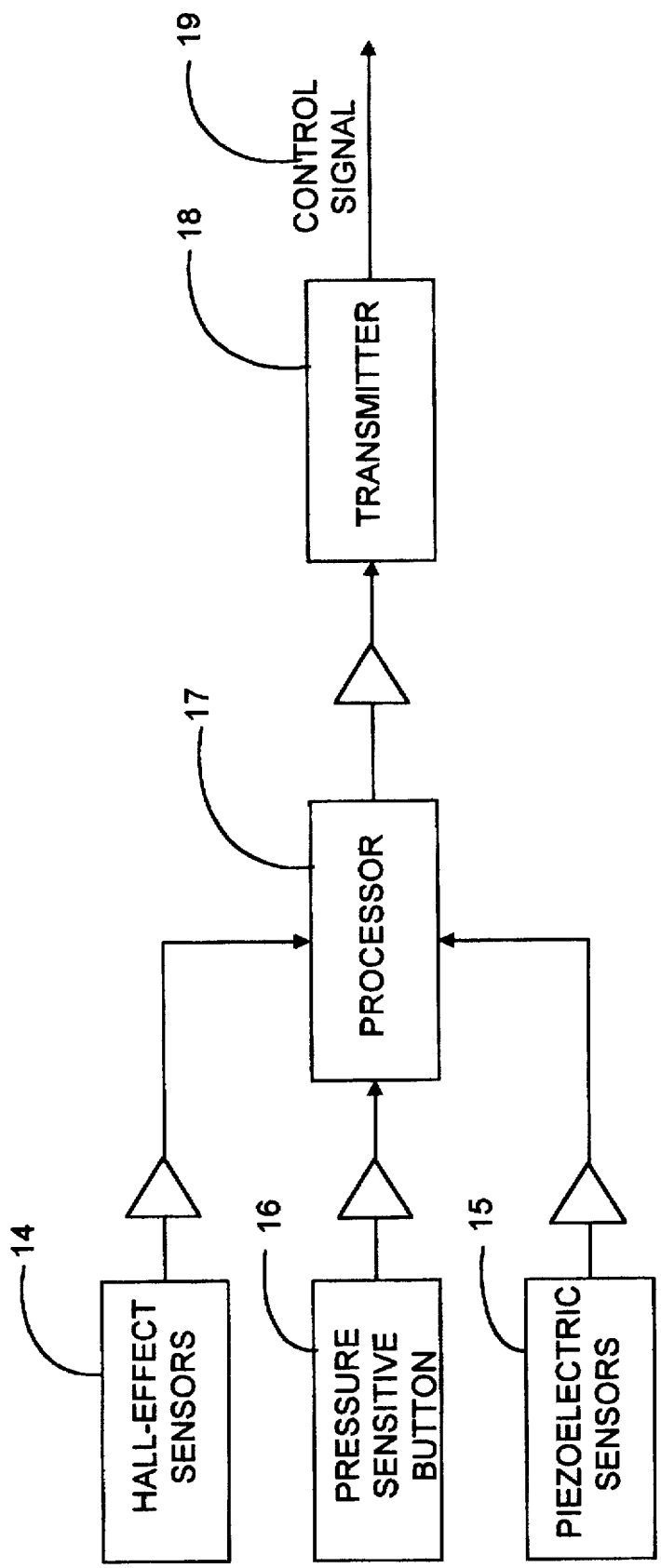
FIG. 7 is a functional block diagram illustrating the overall operation of the device.

FIG. 7 is a functional block diagram illustrating the overall operation of the device. Signals from the Hall-Effect 14 & piezoelectric 15 sensors or the pressure-sensitive button switch 16 are transmitted to the onboard processor 17. The resultant control signal 18 is then relayed via the infrared transmitter 19 to the remote receiver.

Hall-Effect Semiconductor Sensors

Although the Hall-effect device can be used in the study of electrically conducting materials, it has many direct practical applications. This application will consider one of the uses of the Hall-effect for measuring the magnitude and orientation of a physical condition or phenomenon in a magnetic field.

The linear Hall-effect sensor semiconductor technology is sensitive enough to detect the earth's magnetic field. The speed and accuracy of these devices have been demonstrated in the determination of the orientation of devices moving through the rotational yaw Y axes. However, the pitch and roll motions have accuracy problems in certain directions and a loss of dynamic range even when using digital signal processing due to null-signal output when the sensor is aligned to the field flux lines. This provides, what may be referred to herein as limit stops. When used in conjunction with piezoelectric sensors, however, the pitch and roll problems are overcome and, within their respective limits, an actual increase in accuracy results.

Figure 13:
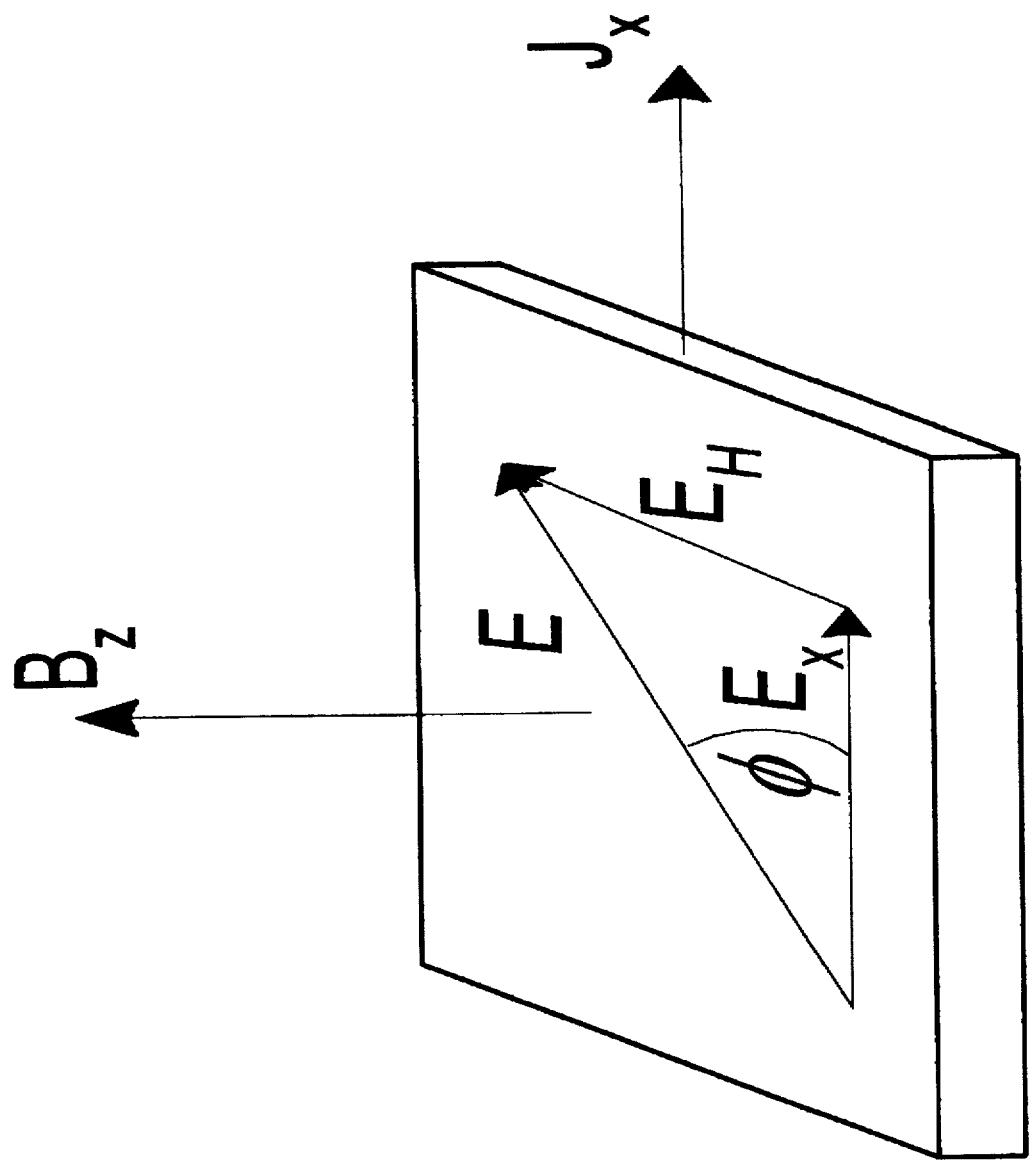
FIG. 13 shows a flat plate Hall-effect, semiconductor with an applied magnetic field.

The Hall Effect is a phenomenon that arises when an electric current and a magnetic field are simultaneously imposed on a conducting material. For example in a flat plate conductor, FIG. 13, if a current density, $J_x$, is applied in the x direction and a component of a magnetic field, $B_z$, in the z direction, then the resulting electric field, $E_y$, transverse to $J_x$ and $B_z$ is known as the Hall electric field, $E_H$, and is given by $$EH_H = RJ_xB_z$$

where R is the Hall coefficient. The Hall coefficient can be related to the electronic structure and properties of the conduction band in metals and semiconductors and has been one of the more important parameters in the characterization of semiconductors. Often, the Hall Effect is described in terms of the Hall angle, f, which is the angle between the net electric field and the imposed current. Therefore, $$\text{Tan } f = E_H/E_x.$$

For the vast majority of Hall Effect studies, the origin of $E_H$ is the Lorentz force, $F_L$, that is exerted on a charged particle as it moves in a magnetic field. For an electron of charge, e, with velocity, v, $F_L$ is proportional to the vector product of v and B; or, $$F_L = ev'B.$$

When a current flows in the Hall element, a voltage appears across the terminals. This voltage is a function of $B_n$, the normal flux component, the Hall coefficient, the geometry of the material, and the current.

We note that the maximum Hall angle is produced when the Hall element is perpendicular to the direction of B, the incident magnetic field. In the absence of a strong, close magnetic field source, the Hall element will be susceptible to the forces of the Earth's magnetic field.

Although the Hall-effect sensor works well in the vicinity referenced North at 0° through 90° and South 180°–270° for pitch and roll. Where the signal exhibits minimum slope, it suffers dynamic range loss when outside the referenced accordant ranges.

Figure 11:
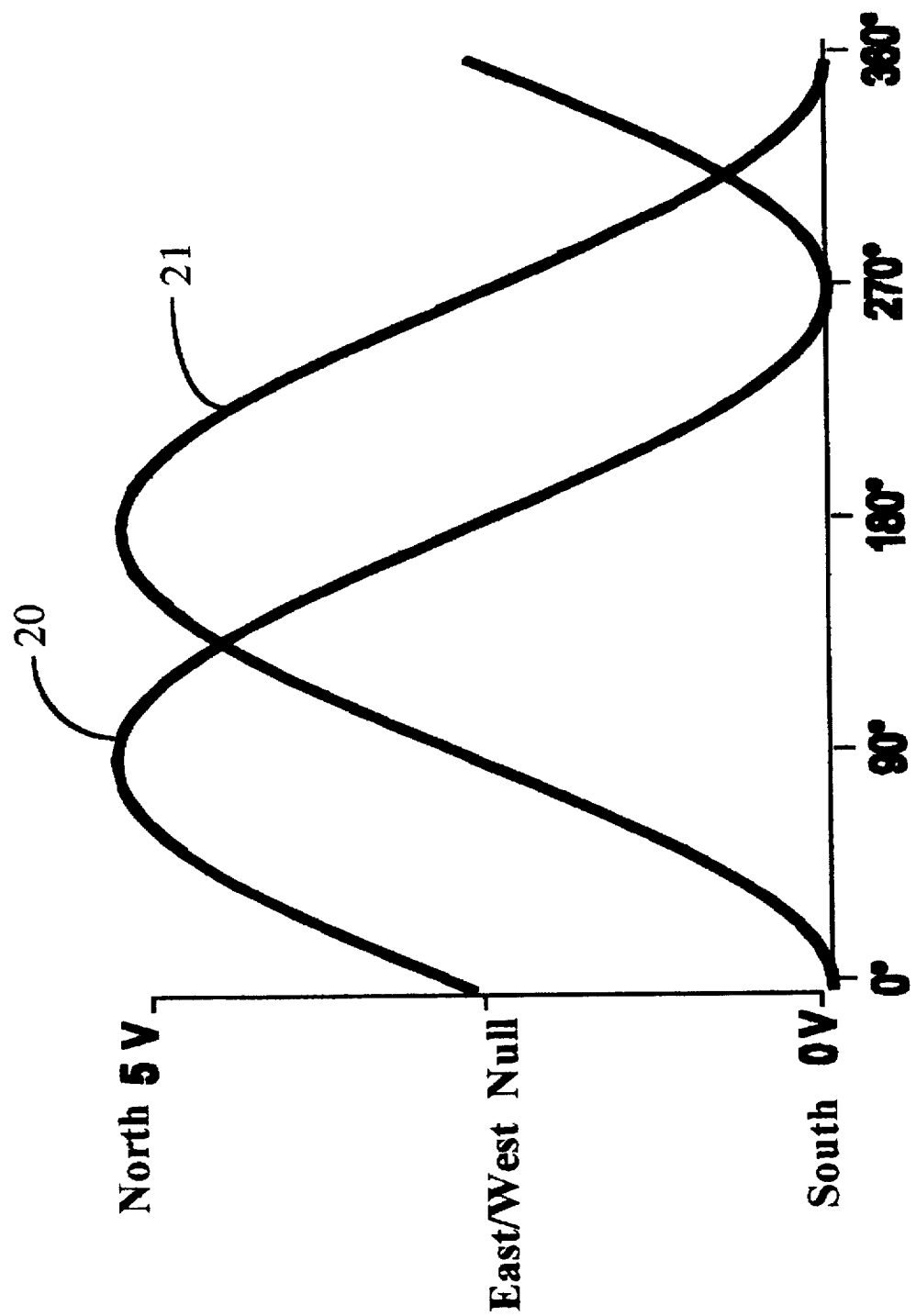
FIG. 11 depicts Hall effect sensor output waveforms as sampled in the time domain.

In FIG. 11, the Hall-effect output waveforms are depicted showing the relative voltage output during the yaw motion giving an angle of orientation. The 5V peak to peak output varies according to the orientation of the sensor. Utilizing multiple sensors oriented 90° apart 20 & 21 provides an acceptable response over 360°. If the magnetic field $B_z$, represents the flux from the Earth's magnetic field—running parallel to the surface in the North-South direction—the device can be rotated about the X-axis to generate the desired pitch output signal. Therefore, the device, when rotated in the Y axis yaw, will yield maximum peak to peak signal when pointing North or South, and will yield signal minima null when pointing East or West.

The disadvantage of utilizing Hall-effect devices for sensing the Earth's magnetic field, is that, although they work well measuring yaw, they produce ambiguous signals when introduced to pitch and roll. As the device is rotated toward the East or West directions yaw, the effective output signal dynamic range decreases for pitch until eventually the device appears not to be moving at all. The device, once returned to the North-South or Z axis direction, now shows these same range losses for roll. In order to eliminate these ambiguous signals, the device must automatically increase its dynamic range by utilizing a programmable D/A converter gain control. The device must also be coupled with other sensors thus providing fusion capable of detecting varying orientations during pitch or roll movements.

Thinfilm Piezoelectric Sensors

Thinfilm, piezoelectric sensors, which have been constructed to work as accelerometers, are force sensing devices capable of determining minute changes in G-force making acceleration measurement possible. Their usage to date has been limited to vibrating tuning fork accelerometers that deflect along the quartz beam under acceleration. When used in conjunction with the semiconductor Hall-Effect sensors, the calculated angular vector as described allows translational and rotational orientation information to be accurately discerned. The compression/beam mode piezoelectric accelerometers, of the character of those described herein, are relatively new, yet heady as sensitive and a lot more application flexible than their more conventional and more expensive counterparts.

Piezoelectric accelerometers work on principles similar to those found in thermostats. A bi-metal foil is created, which, when subjected to forces of acceleration, creates a measurable voltage output. Piezoelectric films require no external voltage source yet generate signals greater than that from mechanical strain gauges after amplification and are less affected by gravity. The frequency response of piezoelectric accelerometers is not limited by high gain amplifiers.

Figure 10A:
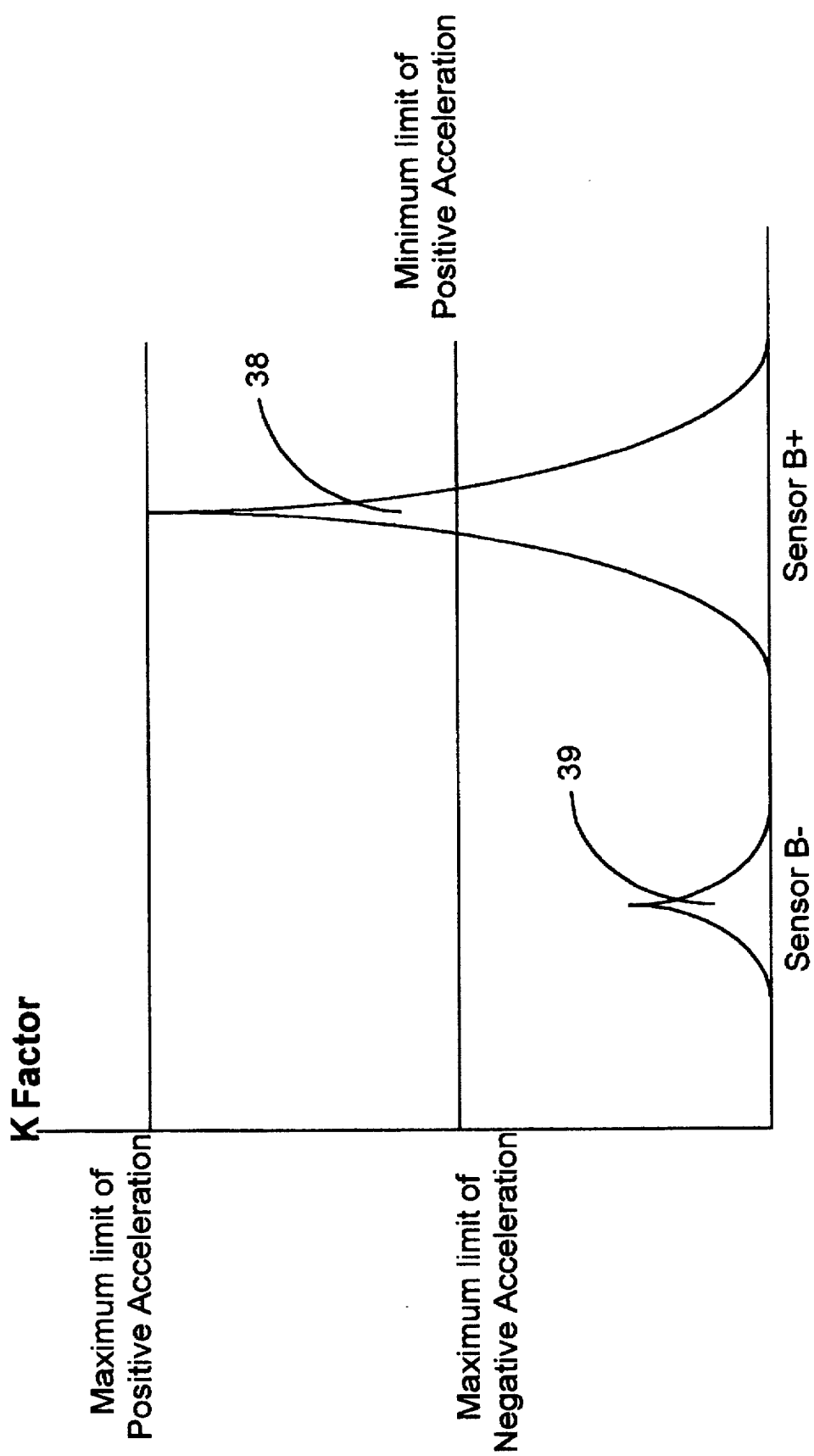
FIG. 10a&b depict piezoelectric sensor positive and negative translational acceleration output levels as sampled in the time domain.

The waveform chart of FIG. 10A shows the corresponding difference from the last known peaks or jerk factor K in relation to the translational motion of the sensor pair shown in FIG. 3a, items 9, 10 & 11.

Figure 12:
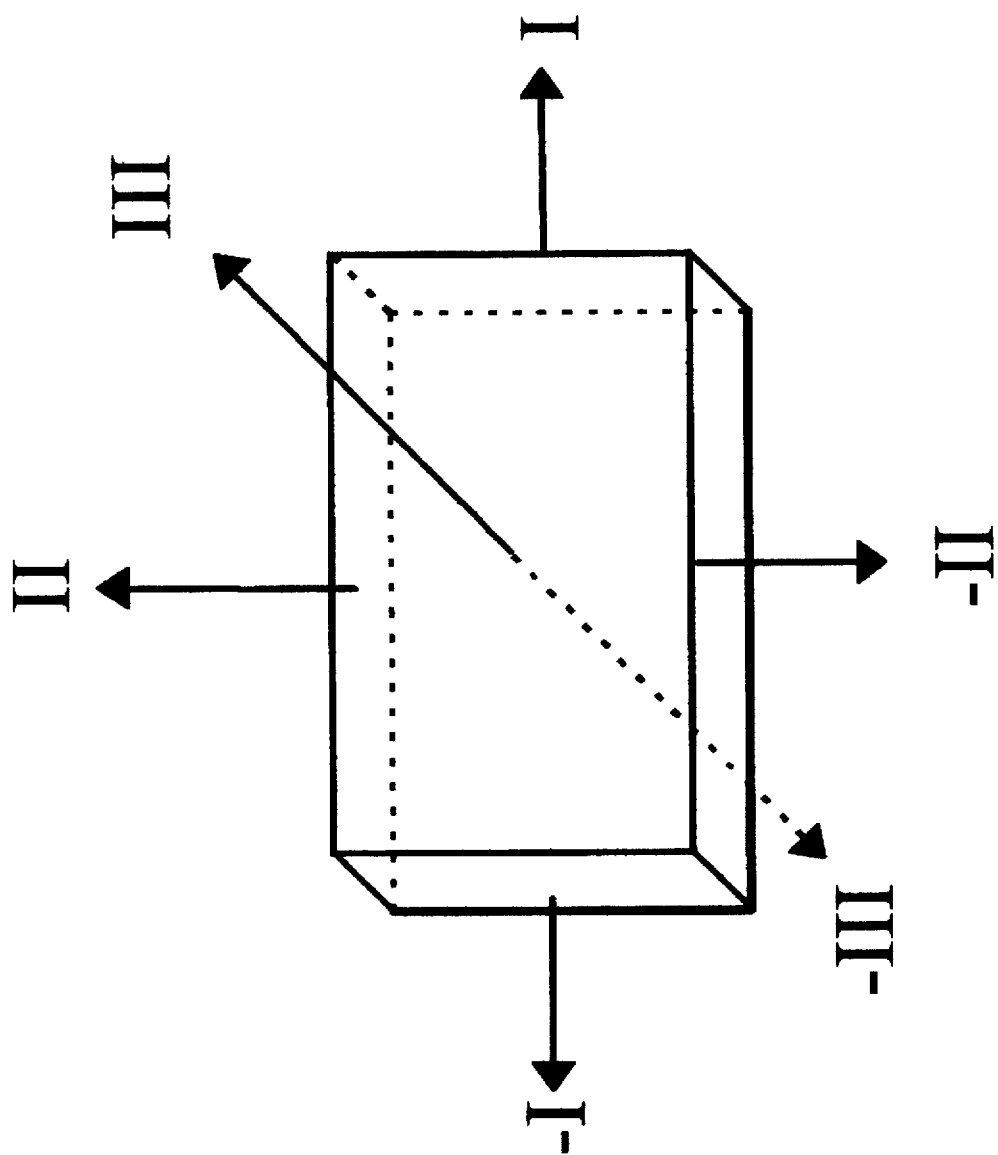
FIG. 12 identifies the axes relevant in discerning the direction of magnetic field lines of force by Hall-effect sensors.

Piezo films have anisotropic electromechanical properties. That is, the electromechanical responses of the film are different depending on the direction of applied force. Discussions of piezoelectric response in piezo film must account for this directional dependence. In accordance with standard notation, a two digit subscript numbering system has been established to denote the relevant piezoelectric constants. The basis for this numbering system is the numbered axis shown in FIG. 12. The Fig. identifies the length I, width II, and thickness III axes. For uniaxially oriented piezo film, the length I axis corresponds to the direction of applied force; the width I axis is transverse to the direction of force.

The first number of the two digit subscript indicates the electrical polarization axis of mechanical stimulation. With piezo films, the polarization is always applied in the thickness III axis; the electrical field is parallel to this axis.

Mechanical stress can occur in all three dimensions. Compressive stress is defined as negative while tension is defined as positive. Therefore, the piezoelectric strain constant, $d_{31}$ describes the strain which occurs in the thickness III direction. Similarly, the piezoelectric stress $g_{32}$ describes the electric field produced in the thickness III direction when a stress is applied in the width II direction.

The polarity of a piezo film electrical signal resulting from a mechanical force is easily determined from the piezoelectric stress constant "g". Compressional stress in the thickness direction, T<0, causes an open circuit voltage to appear across the electroded film surfaces with a polarity which is opposite that of the poring voltage.

Figure 14:
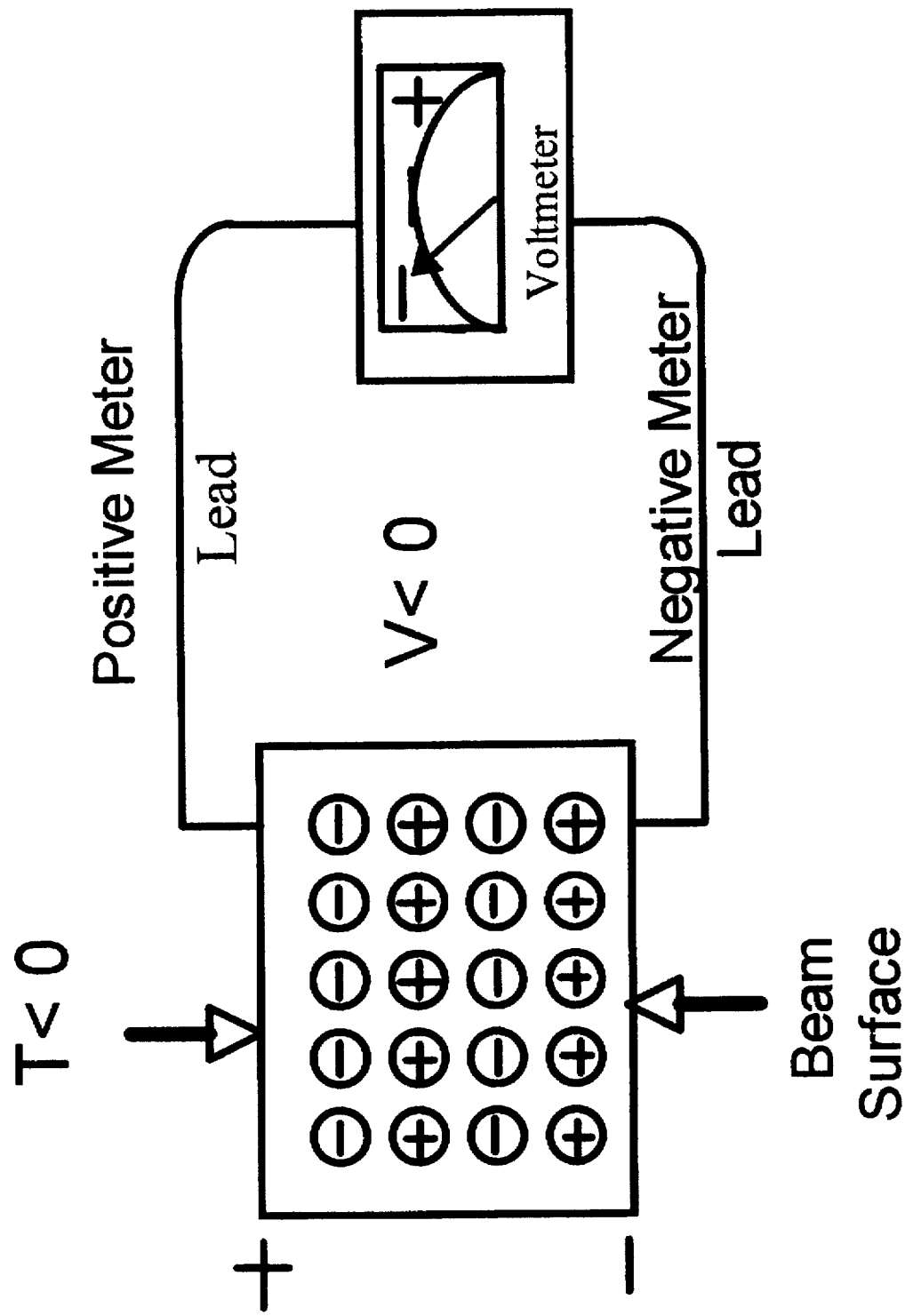
FIG. 14 illustrates the effects of piezoelectric compressional stress.

FIG. 14 illustrates the effects of compressional stress. Since the applied compression is in the thickness direction, the constant $g_{33}$ verifies the correct open circuit voltage polarity:

$$V = -g_{33} Tt$$

where $V$=resulting open circuit voltage $g_{33}$=piezoelectric stress constant $g_{33}<0$ T=applied stress T<0 for compression t=thickness of piezo film Since compressional stress is negative in standard notation, and since $g_{33}$ is negative for piezo film, then the voltage V is also negative.

Orientation and fixturing play an important pad in their sensing abilities. The electromechanical responses of piezo films are anisotropic. That is, the electromechanical responses differ depending on the direction of the mechanical stimulus. Compressive stress is defined as negative, while tension is positive. Thus, the polarity of the output voltage is defined as negative, while tension is positive. Thus, the polarity of the output voltage is indicative of the direction of the stress applied. The orientation and mounting of the film determines the direction of the incident stress. Fixturing is important for two reasons. First, unwanted vibrations in the film will cause output voltages detrimental to the expected signal. Secondly, the fixturing can provide necessary additional grounding effective in reducing EMI Sensor Array Fusion The Z axis aligns along the North-South axis and is used as the reference for all magnetic sensing described. In FIG. 3A, the Hall-effect sensor device pairs 5, & 6, when in motion, maintain a 90° phase difference while rotating about the Y axis or yaw angular motion. When the device is moving in the yaw motion away from the perpendicular Y axis position, a loss of sensor output signal dynamic range occurs. When the front Hall-effect sensors 5 sense motion without any change in signal level from the edge sensors 6, the device is rotating in the 'pitch' angular motion. When the device is moving in the pitch motion away from the perpendicular X axis position, a loss of sensor output signal dynamic range occurs. When both Hall-effect sensors pairs 5 & 6 show no change in output and are at the null signal level shown in FIG. 11 the piezoelectric sensors are discerning rotation in the 'roll' angular motion. When the device is moving in the 'roll' angular motion away from the perpendicular Z axis, a gain in dynamic range occurs from the null East-West direction shown in FIG. 11.

Figure 8:
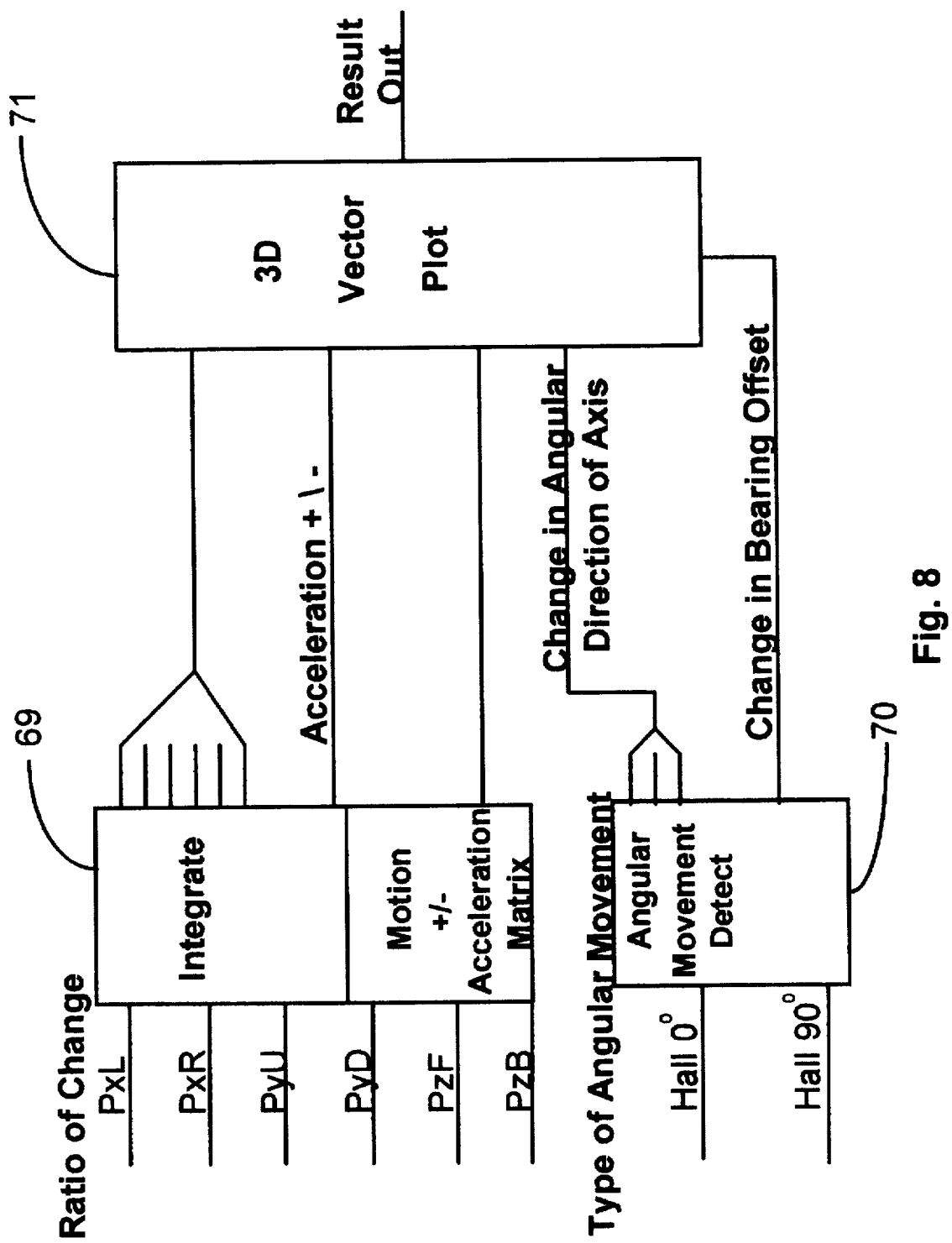
FIG. 8 is a process flow diagram illustrating the sensor computational processing steps.
Figure 9A:
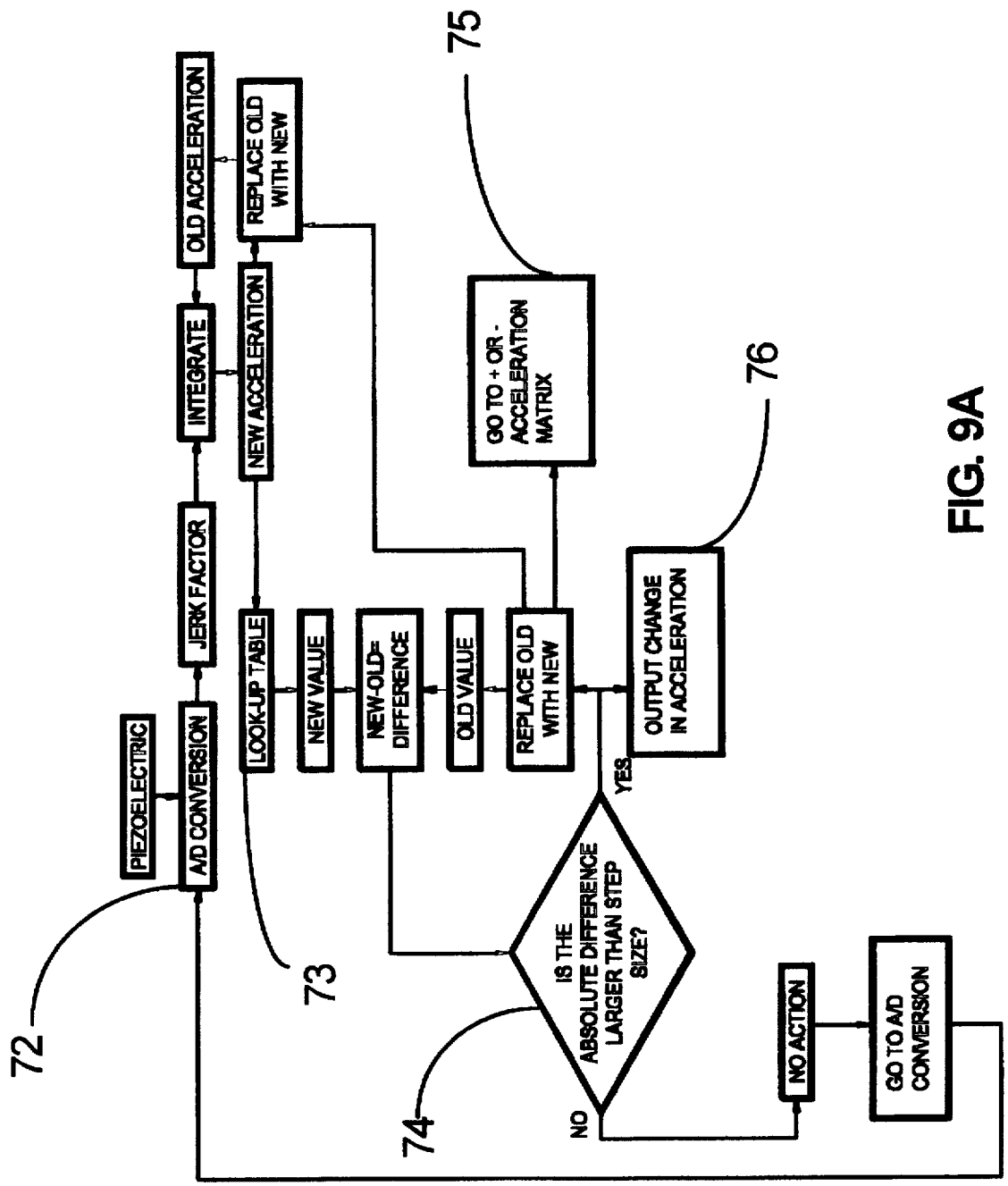
FIG. 9a is a process flow diagram illustrating the detailed steps for computing a single piezoelectric sensor change in acceleration.
Figure 9B:
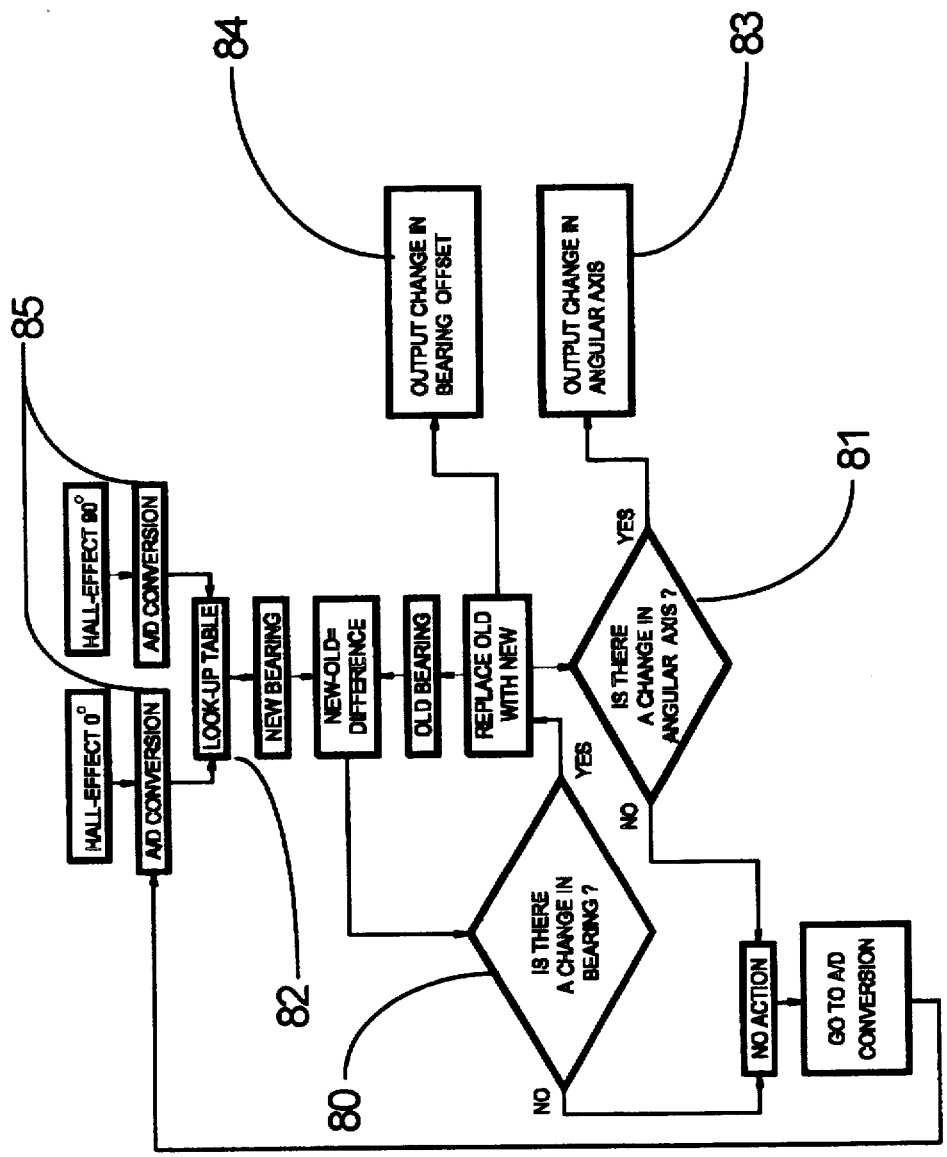
FIG. 9b is a process flow diagram illustrating the detailed steps for computing a single Hall effect sensor change in angular rotation.

The piezoelectric sensors use a table and vector processing to locate the device along the Y pitch axis. FIGS. 8, 9A & 9B show the process for position and orientation sensing. After the A/D 85 sampling is done, determination of the angular orientation 70 of the smart mouse 13 is done through a search in a look-up-table 82 which contains precalculated 80, 81, 83 & 84 values of change in angle vs. device output parameters, this is achieved through vector computations. To overcome this sensor dynamic range signal losses, thinfilm piezoelectric sensors have been incorporated in the smart sensor assembly FIG. 2. The piezoelectric pairs shown in FIG. 3a 9, 10 & 11, of those shown in FIG. 3b 50 & 52 can both provide translational motion sensing along the X, Y & Z axis. FIG. 8 shows X axis signal names 69 PxL and PxR for left and right translational movement, Y axis signals PyU and PyD for up and down movement and Z axis signals for forward and backward movement. The piezoelectric pairs shown in FIG. 3b 50 & 52 with signal names PxL, PxR, PyU and PyD are used for determining translational movement through all three X, Y and Z axis. This is accomplished by arranging piezoelectric pairs 50 & 52 90° opposed and at a 45° angle away from the X, Y and Z axis. Here only the two piezoelectric pairs are required for three axes of absolute translation movement. The piezoelectric sensor pairs 29 & 30 shown in FIG. 4 are comprised of parallel opposed sensors. Compression intensity is greater on the inside sensor 30 of each pair when the motion is either X-axis Left, Y-axis Up or Z-axis Forward. The outside sensor 29 compression intensity is greater in the opposing direction. This sensor arrangement and its associated pre-calculated table of log differences tell the device the direction it is moving relative to its last known position. The intensity of the deflected compressive force on the piezoelectric sensor, shown in FIGS. 5A & 5B, provide a measure of acceleration similar to those shown in FIGS. 3a & 3b. The 'jerk factor', shown in FIG. 9A, and their functions 72, 73, 74 & 76 determine the rate of change in acceleration.

Once the initialization signal is received by the sensor device, all movement becomes relative to the device. When used as a pointer, the initializing signal is sent when motion is first sensed and the button 2 is pressed. A known motion causes the device to reinitialize and establish a new position relative to the North-South magnetic field along the Z axis of the device. This occurs only when utilized as an orientation sensor. In FIG. 11, the sinewaves 20 & 21 for Hall-effect sensor pairs 5, 6 show magnetic field sensitivity as a function of angle. The yaw or pitch movement will show the point on the sinewave from which direction is determined. When movement is sampled in the time domain acceleration can be determined. pitch movement will show the point on the sinewave from which direction is determined. When movement is sampled in the time domain acceleration can be determined.

Figure 10B:
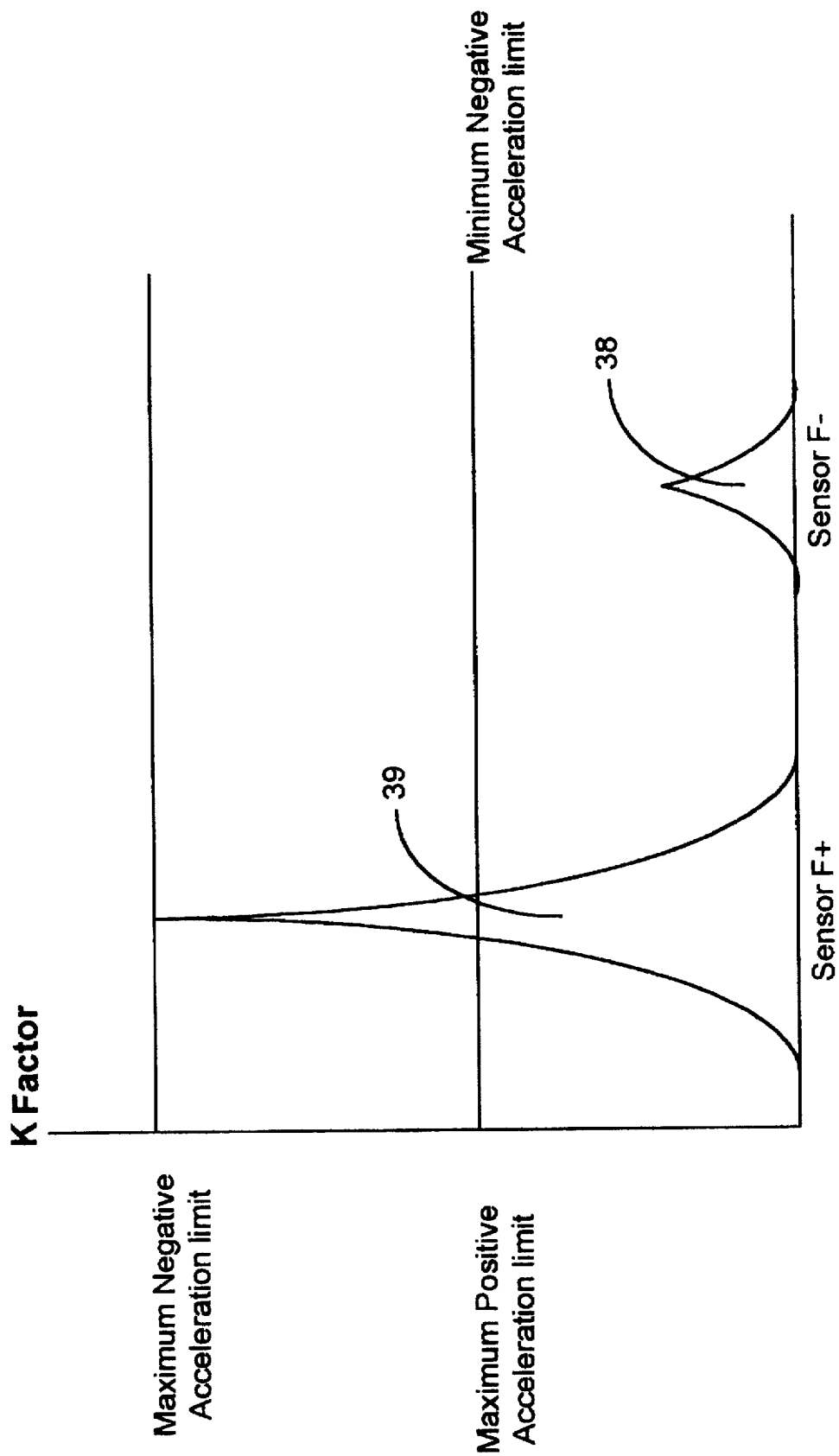

The Hall-effect sensors, when at or near perpendicular to the Z axis, require X, Y & Z axis accelerometer vector values to determine roll angular motion. To understand piezoelectric acceleration sensing through spatial dimensions, we must first explain how the piezoelectric sensor components are used for determining X, Y & Z axis motion. FIG. 4 shows the accelerometer construction details with masses 31 & 32 and each piezoelectric sensor 29 & 30 disposed at opposite sides of the beam 54. This arrangement of piezoelectric sensors and hardware are constructed to make a bi-directional accelerometer utilized in all axes. When accelerating in the forward direction, the mass 32 transfers maximum pressure to the piezoelectric sensor 30 while the mass 31 transfers relative minimum pressure to the piezoelectric sensor 29 denoting motion along one axis. When moving forward in any direction, the difference between 29 & 30 is equal to or greater than 2X. When slowing down, or under negative acceleration, FIG. 10a shows jerk factor K. When pressure is applied, it causes piezoelectric sensor 30 to show less difference in K factor 38 & 39 than piezoelectric sensor 29 utilizing the masses 31 & 32. A ratio of 2X or greater is maintained until stop or redirection occurs. This jerk factor and ratio is used to determine acceleration and is represented as peak amplitude level in FIG. 10a & 10b. The peak 38 in FIG. 10b represents forward positive F+ and B− negative. The peak 39 represents backward positive B+ and F− negative.

In summarization, this innovative approach utilizes two single ended or differential pairs of Hall-effect sensing components arranged at a 90° opposing angle for absolute determination of angular yaw, pitch movement and roll detection aided by piezoelectric motion sensing elements. The sensing along three translational axes, X, Y and Z, with bi-directional capability, utilizing only two pair of piezoelectric components arranged at a 90° opposed angle which are mounted at a 45° angle on a circuit card shown in FIG. 3b for absolute determination of X, Y and Z axes movement. Utilization of both of the above mentioned sensor arrangements and technologies assembled into one unit comprising one or more digital signal processors, a digital to analog converter and one or more analog to digital converters for expanding the dynamic range of a sensor signal section or portion thereof, for the purpose of orientation and position sensing, detection and automatic gain accuracy for control and signal processing. The transmitting of X,Y & Z, three dimensional vector, plot or coordinate data as shown in FIG. 8 71 to a receiving remote device for internal feedback for self-orientation control applications using a handheld device is an embodiment. In addition, a pair of piezoelectric sensors mounted at a 45° angle aligned along the X axis on a circuit card and utilizing two Hall-effect sensor pairs 5 & 6, 90° opposed on the same circuit card, aligned along the Z and X axes respectively, as shown and described above are utilized in a handheld device or mouse.

Figure 15:
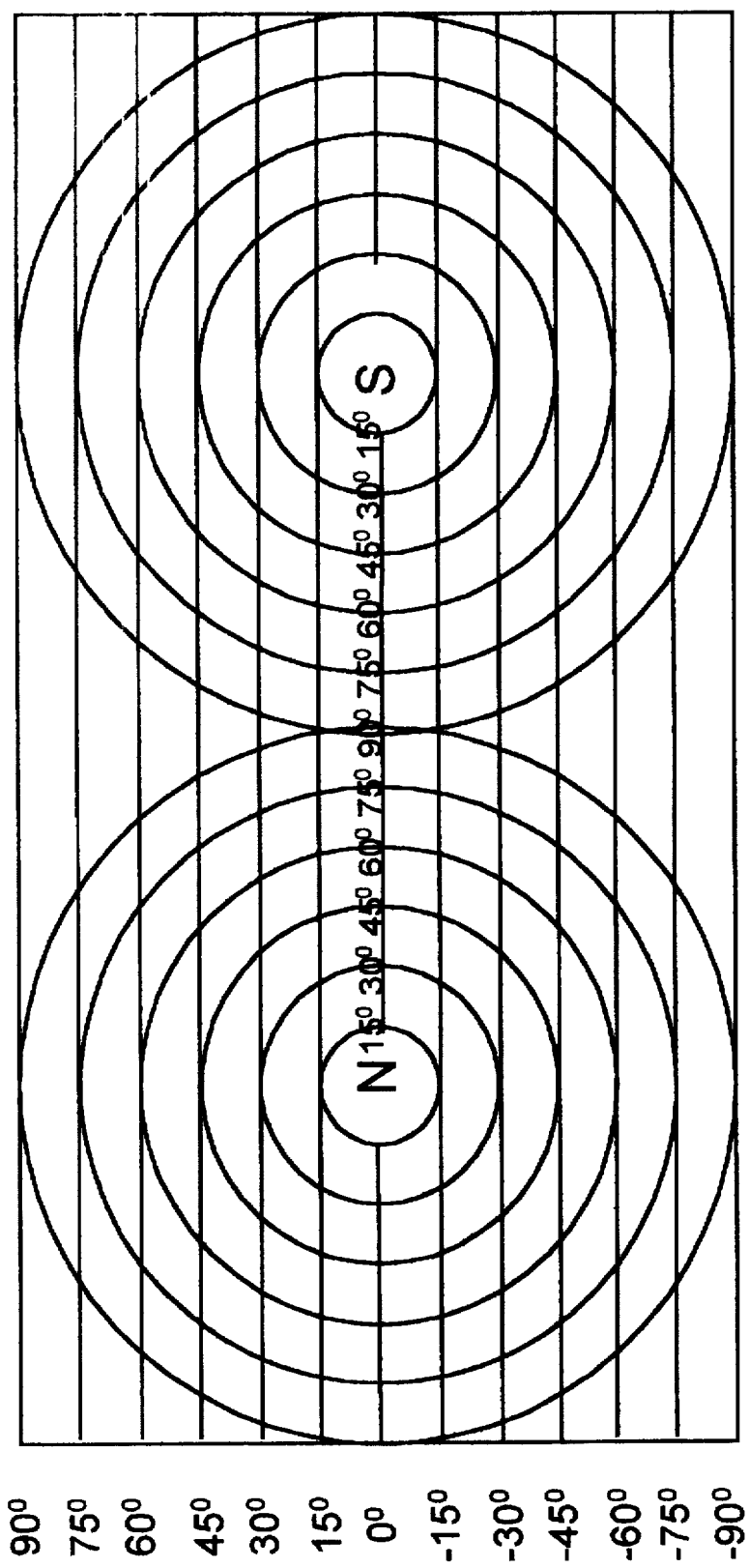
FIG. 15 shows the intersecting magnetic and gravitational level lines, produced by the Hall-effect and piezoelectric sensors.

The unique, complimentary effect of combining both of these types of sensors is the key to the operation of the device. As shown in FIG. 15, the level lines radiating from the magnetic north and south directions are essentially circular; therefor, when a Hall-effect sensor is rotated about the magnetic north-south axis, there is no change in output voltage. This makes the orientation of the device somewhat uncertain. The addition of a piezoelectric sensor solves this problem by creating a second set of horizontal level lines. Thus, a combination of Hall-effect and piezoelectric sensors can create a unique set of output signals for any given orientation. FIG. 3b shows the preferred sensor array orientation configuration for the device. The thin-film piezoelectric sensors 50 & 52 comprise a smart device, comprising a circuit card having pairs of piezoelectric sensors, 90° opposed, both mounted at 45° angles on said circuit card, disposed to provide x, y, and z translation and yaw, pitch and roll angular rotation information data, for position and orientation control of said device.. This provides a complimentary response in relation to the 90° opposed pairs of Hall-effect sensors 5 & 6.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the claimed invention.

What is claimed and desired to be protected by United States Letters Patent is:

1. In combination, a handheld, freespace, remote mouse utilizing a fusion of both Hall effect and piezoelectric effect solid state sensor technologies devices, for remotely pointing, then controlling a 3D virtual object's orientation and/or determining the device's own absolute orientation, thereby determining the orientation and direction of operatively associated physical objects.

2. In combination, a smart device comprising a plurality of thinfilm piezoelectric-effect sensors and a plurality of semiconductor Hall-effect sensors for sensing a fixed magnetic field for orientation through six degrees of freedom providing a point of reference of the device in freespace relative to the fixed field for determining location thereof.

3. A device incorporating a back to back, physically opposed pair, of thinfilm piezoelectric-effect sensors for providing a ratio difference respectively between them for determining direction of acceleration forces thus becoming a single bi-polar accelerometer component capable of sensing a rate of change thereof.

4. A smart orientation-sensing device comprising a semiconductor Hall-effect device, incorporated in a controllable object, said Hall-effect device being incorporated for sensing a fixed magnetic field, in freespace, for determining object orientation providing on-screen cursor position on a viewable screen and/or device control in the yaw, around y, and pitch, around x, axis with an inherent automatic limit stop function, providing two degrees of motion sensing in a three dimensional space.

5. A smart, Hall-effect semiconductor device, of claim 4, incorporated in a controllable object, disposed for sensing a fixed magnetic field, determining object orientation and providing on-screen cursor position and/or device control in the yaw, around y, and roll, around z, axis position indicating with an inherent automatic limit stop function, thereby providing two degrees of motion sensing in a three dimensional space.

6. The device of claim 5 further providing yaw, around y, pitch, around x and roll, around z, with an inherent automatic limit stop function, providing three degrees of motion sensing along three distinct axis.

7. A smart, Hall-effect semiconductor device, a controllable object, said device being incorporated in said controllable object, disposed for sensing a fixed magnetic field, in freespace, for determining object orientation, providing on-screen cursor position on a viewable screen and/or device control for yaw, around y, and a thinfilm, piezoelectric-effect device for determining cursor/object positioning and/or control in the pitch, around x, directions providing two degrees of motion in a three dimensional space.

8. A smart, Hall-effect semiconductor device, a controllable object, said device being incorporated in said controllable object, disposed for sensing a fixed magnetic field, in freespace, for determining object orientation and providing on-screen cursor position and/or device control for yaw, around y, with a thinfilm, piezoelectric-effect device operable in conjunction with a Hall-effect semiconductor device for enhanced accuracy and resolution in determining cursor position/object orientation and/or control in the pitch, around x, directions providing two degrees of motion in a three dimensional space.

9. A smart, Hall-effect semiconductor device, a controllable object, incorporated in said controllable object, constructed and arranged for sensing a fixed magnetic field, in freespace, determining object orientation and providing on-screen cursor position and/or device control for yaw, around y, and a thinfilm, piezoelectric-effect device for determining cursor position/object orientation and/or control in the roll, around z, directions providing two degrees of motion in a three dimensional space.

10. A smart, Hall-effect semiconductor device, an orientable object, said device being incorporated in a controllable object, constructed and arranged for sensing a fixed magnetic field, in freespace, determining object orientation and providing on-screen cursor position and/or device control for yaw, around y, with a thinfilm, piezoelectric-effect device utilized in conjunction with a Hall-effect semiconductor device for enhanced accuracy and resolution in determining cursor position )object orientation and/or control in the roll, around z, directions providing two degrees of motion in a three dimensional space.

11. A smart, Hall-effect semiconductor device, incorporated in a controllable object, for sensing a fixed magnetic field, in freespace, determining object orientation and providing on-screen cursor position and/or device control for yaw, around y; and a thinfilm, semiconductor, piezoelectric-effect device for determining cursor/object positioning and/or control in the pitch, around x, as well as roll, around z, directions thereby providing three degrees of motion in a three dimensional space.

12. A smart, Hall-effect semiconductor device, comprising a controllable object, for sensing a fixed magnetic field, in freespace, determining object orientation and providing on-screen cursor position and/or device control for yaw, around y, with a thinfilm, piezoelectric-effect device utilized in conjunction with a semiconductor Hall-effect device for enhanced accuracy and resolution in determining cursor position on a screen and object orientation and/or control in the pitch, around x, and roll, around z, directions thereby providing three degrees of motion in a three dimensional space.

13. A smart, Hall-effect semiconductor device, incorporated in a controllable object, for sensing a fixed magnetic field, in freespace ,determining object orientation and providing on-screen cursor position and/or device control for yaw, around y, pitch, around x, and roll, around z; and a thinfilm, piezoelectric-effect device for determining cursor/object position and/or control in the pitch, around x, yaw, around y, and roll, around x, directions as well as translation along the three axes of the Cartesian coordinate system (X,Y, and Z) providing six degrees of motion in a three dimensional space.

14. The device of claim 13 which is further integrated into a single removable component.

15. A remote control virtual reality glove for the virtual control of actual mechanical systems and robotic, non-robotic devices and virtual objects incorporating the device of claim 2 for sensing orientation and position.

16. The method of operating a device of claim 15 comprising the steps of:

a: inserting an anatomical hand in the glove, b: moving the hand in desired positions and orientations in space to move a cursor or object on a viewable screen to a desired 3D location in a virtual world on the screen.

17. A smart device, comprising a circuit incorporating a pair of the devices of claim 3, mounted in differing planes on said circuit, disposed to provide x, y, and z translation and yaw, pitch and roll angular rotation information data, for position and orientation control of said device in freespace.

18. The method of operating a mouse of the character of a device of claim 1 by gripping the device in freespace, noting its position in space as indicated on a viewable screen and moving it in freespace to reposition a cursor thereof to a designated location.

\* \* \* \* \*